(12) United States Patent
Pereira

(10) Patent No.: US 9,616,863 B2
(45) Date of Patent: Apr. 11, 2017

(54) PARK BRAKE LOCK MECHANISM WITH ENHANCED LOCKING

(75) Inventor: Ryan M. Pereira, Rochester Hills, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 13/978,676

(22) PCT Filed: Jan. 9, 2012

(86) PCT No.: PCT/US2012/020634
§ 371 (c)(1),
(2), (4) Date: Jan. 20, 2014

(87) PCT Pub. No.: WO2012/094669
PCT Pub. Date: Jul. 12, 2012

(65) Prior Publication Data
US 2014/0144279 A1 May 29, 2014

Related U.S. Application Data

(60) Provisional application No. 61/430,744, filed on Jan. 7, 2011.

(51) Int. Cl.
*B60T 7/08* (2006.01)
*G05G 1/04* (2006.01)
*B60T 7/10* (2006.01)

(52) U.S. Cl.
CPC .............. *B60T 7/104* (2013.01); *B60T 7/105* (2013.01); *G05G 1/04* (2013.01); *Y10T 74/20612* (2015.01)

(58) Field of Classification Search
CPC .... Y10T 74/20612; B60T 7/104; B60T 7/105; G05G 1/04
USPC .......... 74/519, 523–525, 529, 534–538, 575, 74/577 R, 577 S; 188/72.1, 72.9
See application file for complete search history.

(56) References Cited

U.S. PATENT DOCUMENTS

| | | | |
|---|---|---|---|
| 656,494 A * | 8/1900 | Wheeler | 74/537 |
| 3,211,269 A * | 10/1965 | Emig | 400/332 |
| 3,335,621 A | 8/1967 | Buchwald | |
| 5,303,610 A | 4/1994 | Noel et al. | |
| 6,105,459 A | 8/2000 | Troiano | |
| 6,817,264 B2 * | 11/2004 | Hiura et al. | 74/512 |
| 7,587,960 B2 * | 9/2009 | Tsuzuki et al. | 74/523 |
| 8,006,588 B2 * | 8/2011 | Kowalski | B60T 7/045 74/523 |

(Continued)

FOREIGN PATENT DOCUMENTS

FR 2853293 A1 * 10/2004 ............. B60T 11/04
WO WO 2010090155 A1 * 8/2010

OTHER PUBLICATIONS

International Search Report and Written Opinion dated Apr. 25, 2012, International Application No. PCT/US2012/020634.

*Primary Examiner* — Adam D Rogers
(74) *Attorney, Agent, or Firm* — Dinsmore & Shohl LLP

(57) ABSTRACT

A park brake assembly includes a base. A park brake lever is pivotal about the base. A pawl is pivotal about a pawl pivot. The pawl is linked to the brake lever. A sector is attached to the base and the pawl releasably locks and unlocks relative to the sector. The pawl includes a pivot slot that receives the pawl pivot and wherein the pawl translates about the pawl pivot changing an angle of engagement of the pawl relative to the sector when subjected to a force.

12 Claims, 4 Drawing Sheets

(56) References Cited

U.S. PATENT DOCUMENTS

| | | | |
|---|---|---|---|
| 8,578,813 B2 * | 11/2013 | Azumi et al. .................. | 74/540 |
| 8,783,131 B2 * | 7/2014 | Fernandez .................... | 74/523 |
| 2003/0010149 A1 | 1/2003 | Hiura et al. | |
| 2007/0227290 A1 * | 10/2007 | Ferenc et al. .................. | 74/523 |

* cited by examiner pivot center pivot center

PARK BRAKE LOCK MECHANISM WITH ENHANCED LOCKING

CROSS REFERENCE TO RELATED APPLICATIONS

This application claims priority of U.S. Provisional Patent Application 61/430,744 filed Jan. 7, 2011, the contents of which are incorporated herein by reference.

FIELD OF THE INVENTION

The invention relates to parking brakes.

BACKGROUND OF THE INVENTION

Parking brakes may include a pawl and sector to lock the parking brake in a desired position. In operation the pawl tip is positioned in a root of the sector teeth to lock the pawl and sector. The pawl rotates under the bias of a spring to enter into the root of the sector teeth as the pawl travels across the sector. One may want an enhanced locking function of a park brake.

There is therefore a need in the art for a parking brake that provides an enhanced locking function. There is also a need in the art for a park brake that provides an enhanced locking function and utilizes a minimum number of components resulting in a cost effective and easily manufactured parking brake.

SUMMARY OF THE INVENTION

In one aspect there is disclosed a park brake assembly that includes a base. A park brake lever is pivotal about the base. The park brake lever is linked to a pawl. A sector releasably mates with the pawl to releasably lock the park brake in position. The pawl includes an angle of engagement to initially lock with the sector to provide a locking position wherein the pawl translates about a pawl pivot to change the angle of engagement of the pawl and sector when subjected to a force.

In another aspect there is disclosed a park brake assembly that includes a base. A park brake lever is pivotal about the base. The park brake lever is linked to a pawl. A sector releasably mates with the pawl to releasably lock the park brake in position. The pawl includes a first and second pivot axis wherein the pawl shifts between the first and second pivot axes to change the angle of engagement of the pawl and sector when subjected to a force.

In a further aspect there is disclosed a park brake assembly that includes a base. A park brake lever is pivotal about the base. A pawl is pivotal about a pawl pivot. The pawl is linked to the brake lever. A sector is attached to the base and the pawl releasably locks and unlocks relative to the sector. The pawl includes a pivot slot that receives the pawl pivot and wherein the pawl translates about the pawl pivot changing an angle of engagement of the pawl relative to the sector when subjected to a force.

DETAILED DESCRIPTION OF THE PREFERRED EMBODIMENTS

Force and Moment calculations

Figure 7:
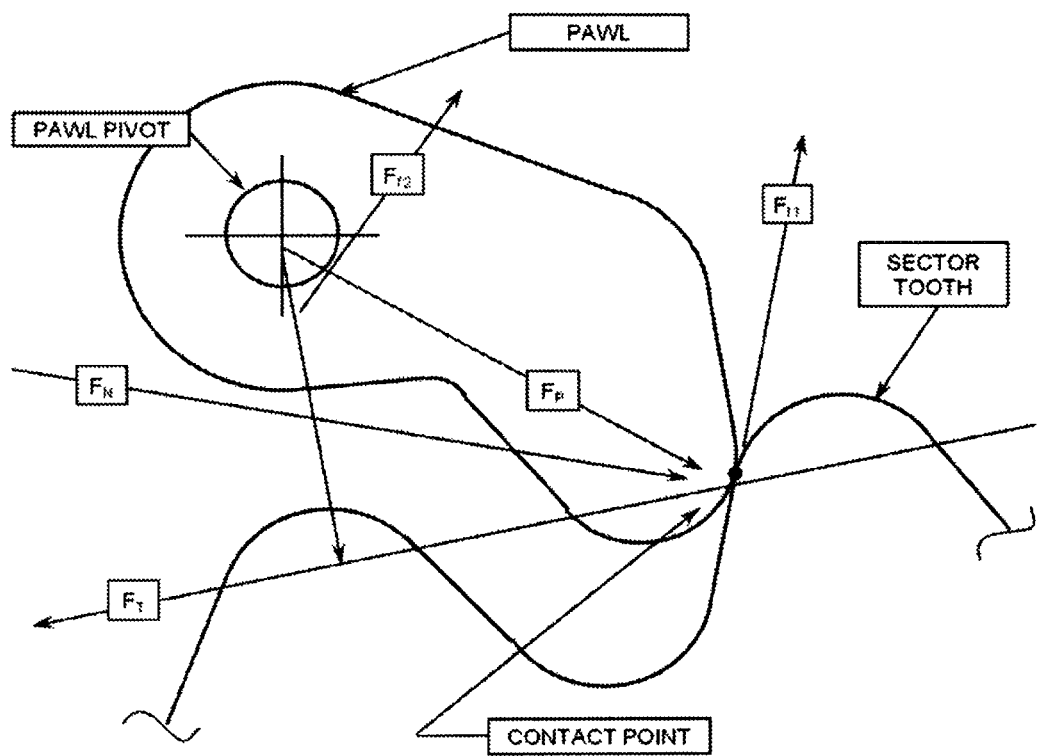
FIG. 7 is a force and moment free body diagram detailing a pawl and sector.

Referring to FIG. 7, the following specifications and definitions are described.

Sector: Primary gear which has a moment applied to it.
Pawl: Secondary gear which applies an opposing moment on the Sector.
Contact Point: The point which the Pawl Tip is contacting the Sector Tooth.
$F_T$: The line of force tangent to the arc of Sector tooth rotation, through the contact point
Fp: The line of force from the Pawl pivot the contact point.
$F_N$: The line of force applied perpendicular or normal, to the Sector tooth at the contact point.
F11: The line of force on the Pawl tip, due to the friction between the Pawl and Sector teeth.
F12: The line of force on the Pawl pivot hole, due to the friction between the Pawl and Rivet or Bushing.

The forces described in more below may be made with reference to the free body diagram of FIG. 7.

Referring to the Figures there is shown one embodiment of a park brake assembly 10. The park brake assembly 10 includes a brake lever 12 that is pivotally mounted to a base 14 to actuate the park brake 10 between locked and released positions. The brake lever 12 is pivotal about a pivot pin 16 that is attached to the base 14. The brake lever 12 includes a rod 18 that is coupled to an actuator 20 on one end of the rod 18 and to a locking pawl 22 at another end of the rod 18. A mounting bracket 24 is attached to the brake lever 12 and is rotatable about the pivot 16. The mounting bracket 24 may be connected to a cable mechanism 25 that links to the brake of a vehicle.

The park brake assembly 10 includes a sector 26 that is attached to the base 14. The sector 26 includes teeth 28 formed thereon that mate with the pawl 22. The pawl 22 includes a pivot slot 29 formed therein and is rotatable about a pawl pivot 30 that defines a pivot axis 32 of the pawl 22. In one aspect, the pivot slot 29 is oversized relative to the pivot 30 allowing the pawl 22 to translate about the pivot 30, as will be described in more detail below. The pawl slot 29 may also have a shape relative to the pivot 30 that allows for translation of the pawl 22. In another aspect, the pivot 30 may have a shape that allows for translation of the pawl 22. The pawl slot 29 may have a larger diameter or size than the pivot 30. As referenced above, the pivot slot may include a predetermined shape to allow translation of the pawl 22. For example, the pivot slot may be ovoid or out of round or have other shapes that allow for the translation or movement of the pawl 22.

In one aspect, the pawl 22 translates relative to the pivot in an amount such that a half lock conditioned is prevented while the pawl does not move to a position where a no lock condition occurs with the sector 26. In one aspect, the pawl 22 may translate such that an angular shift of the pawl 22 is less than 0.1 millimeters.

Figure 1:
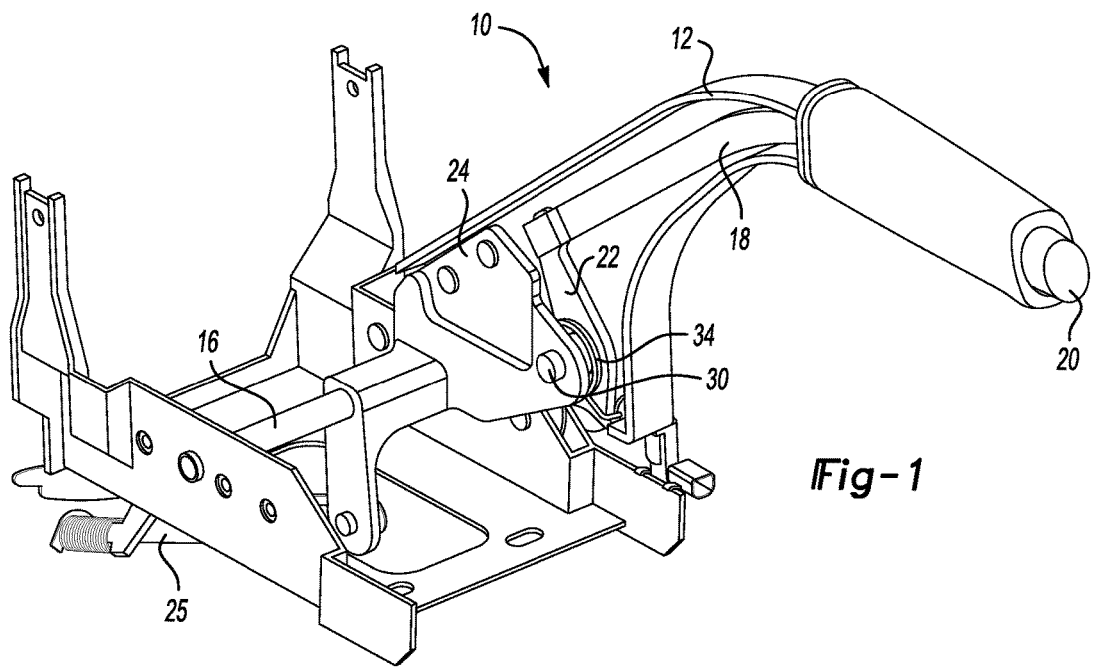
FIG. 1 is a perspective view of one embodiment of a park brake assembly.
Figure 2:
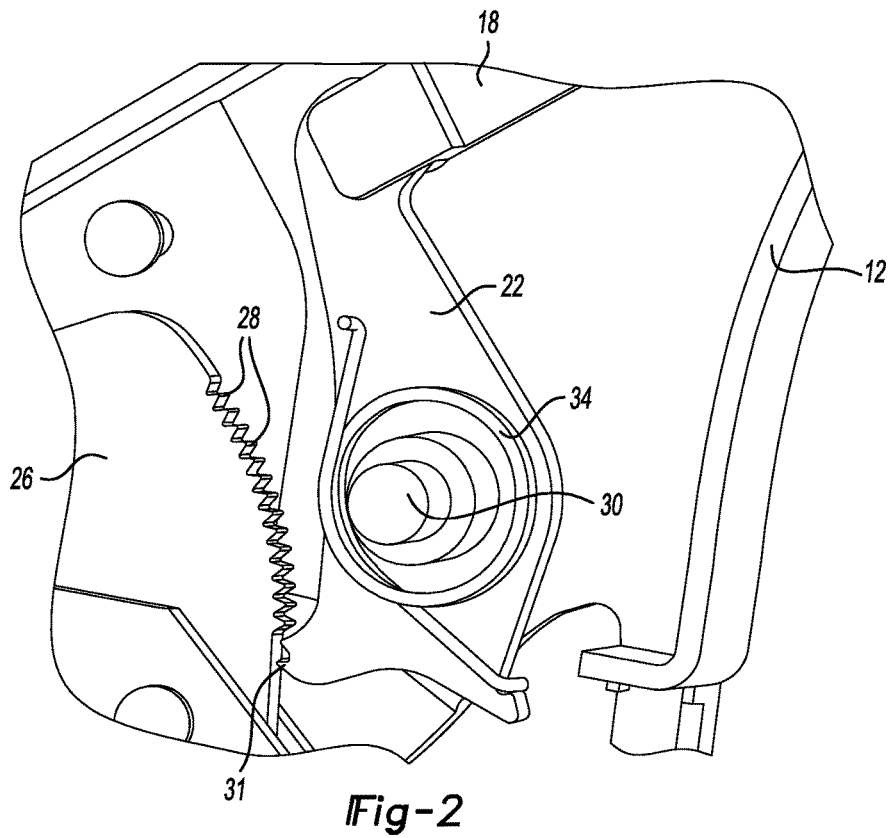
FIG. 2 is a partial perspective view including the brake lever, pawl, sector and biasing member.
Figure 3:
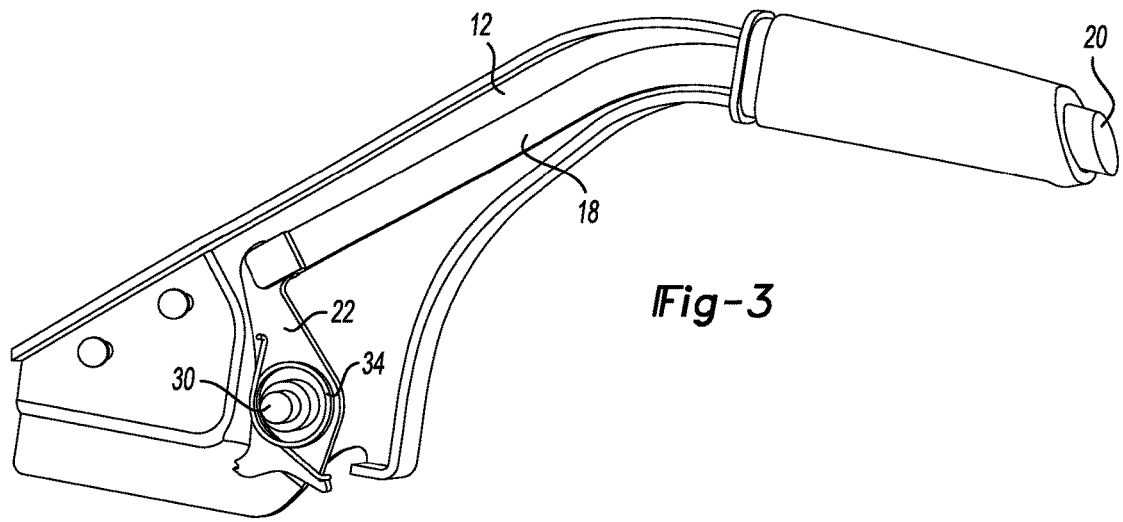
FIG. 3 is a partial perspective view of the brake lever, rod pawl and biasing member.
Figure 4:
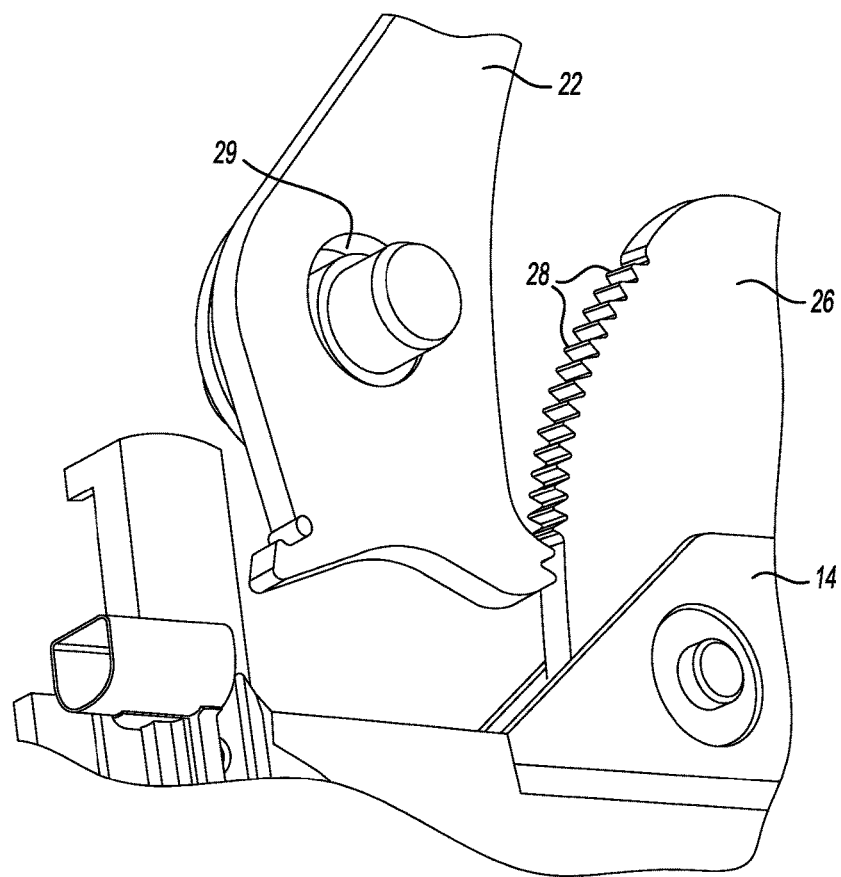
FIG. 4 is a partial perspective view of the pawl, sector and base.

The pawl 22 also includes a tip 31 that enters into the space or root between adjacent teeth 28 on the sector 26. The tip 31 may include various configurations such as the double tip 31 of FIG. 2 or the single tip 31 of FIG. 5.

The pawl 22 also includes a spring member 34 that contacts the pawl 22 at one end of the spring member 34 and contacts the mounting bracket 24 at another end of the spring member 34. The spring member 34 biases the pawl 22 about the pivot 30 in a desired direction as well as biases against the actuator 20 coupled to the rod 18. The biasing force applied by the spring member 34 forces the pawl 22 into the root of the sector 26 between adjacent teeth 28 of the sector 26. The spring member 34 may be of various types and may be mounted at various locations to induce the desired bias on the pawl 22. In the depicted embodiment of FIG. 2, the spring member 34 may be a torsion spring that imparts a clockwise bias to the pawl 22 forcing the tip 31 of the pawl 22 into the root of the sector 26.

Figure 5:
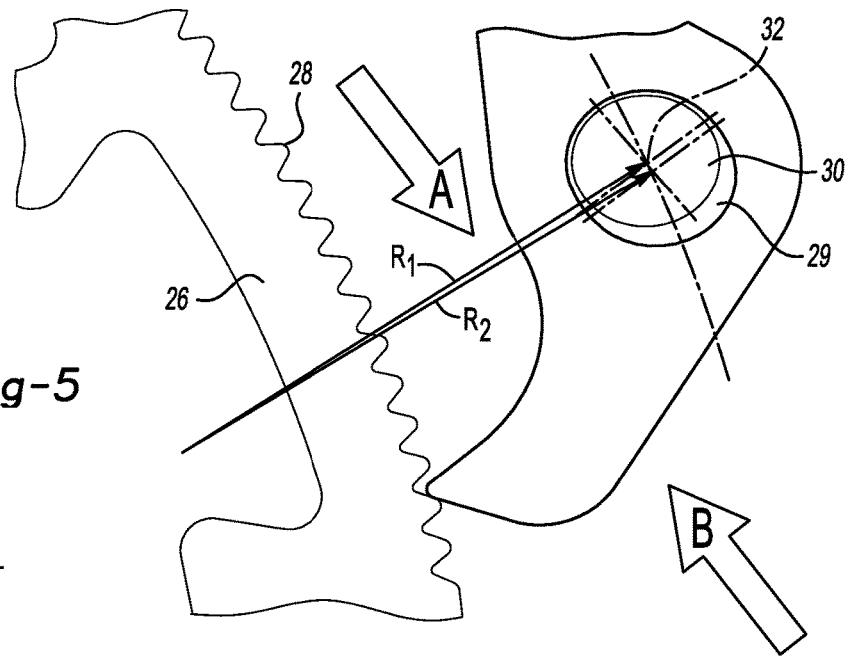
FIG. 5 is a partial perspective view of a pawl and sector in a half lock state.
Figure 6:
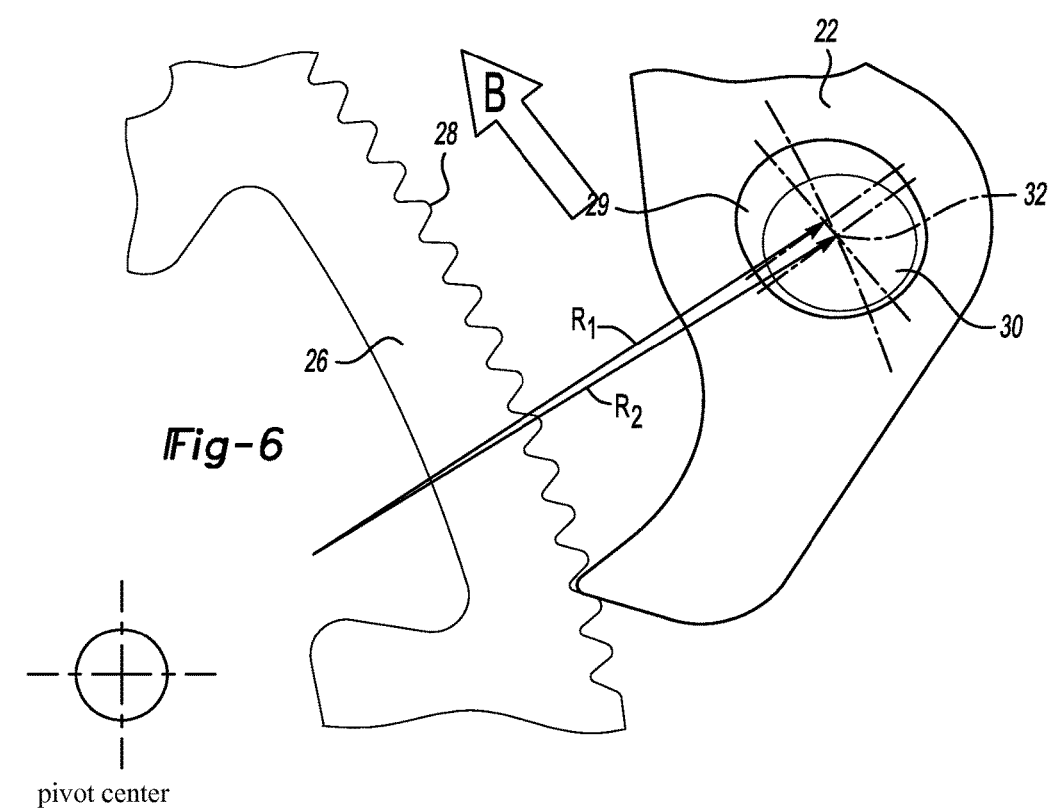
FIG. 6 is a partial perspective view of the pawl translated about the pivot.

Referring to FIGS. 5 and 6 there is shown a partial view of a pawl 22 and sector 26 in a half lock and translated position respectively. In FIG. 5 the spring member 34 force is represented by the direction A arrow which rotates the pawl 22 clockwise about the pivot 30 and pushes the pawl 22 against the pivot 30 in the direction A. When the pawl 22 moves in an opposing direction or clockwise, the sum of the moments about the pawl 22 results in a contact angle between the pawl 22 and sector 26 such that there is a tip to tip relationship where the friction forces (F11 above) of the pawl 22 and sector 26 prevent the pawl tip 31 from dropping into the root of the sector 26 between adjacent teeth 28. In this position the sector 26 exerts a force on the pawl 22 shown by the direction B.

The force applied by the sector 26 in the direction B causes the pawl 22 to translate about the pivot 30, as shown in FIG. 6. The pawl 22 has moved or translated from the pivot axis 32 (R1) shown in FIG. 5 to the pivot axis 32 (R2) shown in FIG. 6. The pivot slot 29 is oversized or has a predetermined shape allowing the pivot to move from one portion of the pivot slot 29 to another portion of the pivot slot 29. Once the pawl has translated its position or moved from a first pivot axis 32 in FIG. 5 to a second pivot axis 32 in FIG. 6, the sum of the forces or moments changes such that the angle of the force or direction of the force causing the rotation of the pawl 22 changes overcoming the resistance of the tip to tip frictional forces of the half lock condition of FIG. 5.

In use the park brake 10 may be moved from an initial unlocked position as an operator depresses the actuator 20 against the biasing force of the spring member 34. The brake lever 12 is moved about the pivot 16 such that the pawl 22 travels over the sector 26. When the operator releases the actuator 20, the spring member 34 exerts a rotational force on the pawl 22 such that the pawl 22 rotates about the pawl pivot 30. The tip or tips 31 of the pawl 22 is urged into the root of the sector 26 between adjacent teeth 28 of the sector 26 locking the pawl 22 relative to the sector 26.

The sector 26 may exert a force on the pawl 22 such that the pawl 22 translates about the pawl pivot 30, as described above. The translation of the pawl 22 about the pawl pivot 30 allows the spring member to rotate the pawl 22 into the sector 26 preventing a half lock condition.

The park brake 10 is now releasably locked in position. To remove or unlock the park brake 10 an operator may lift the brake lever 12 unloading the engagement of the pawl 22 and sector 26 and again depress the actuator 20 rotating the pawl 22 out of the sector 26 such that the brake lever 12 may be pivoted about the pivot 16 to the initial starting or disengaged position.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A park brake assembly comprising:
   a base;
   a park brake lever pivotal about the base;
   a pawl pivotal about a pawl pivot, the pawl linked to the brake lever;
   a mounting bracket attached to the brake lever and rotatable about a pivot pin attached to the base;
   a sector attached to the base, the pawl releasably locking and unlocking relative to the sector;
   the brake lever including a rod connected to an actuator for actuating the park brake assembly and a spring member contacting the pawl at one end of the spring member and contacting the mounting bracket at another end of the spring member biasing the actuator and biasing the pawl about the pawl pivot and into engagement with the sector;
   wherein the pawl includes a pivot slot that receives the pawl pivot and wherein the pawl translates about the pawl pivot changing a contact of the pawl relative to the sector when the sector exerts a force upon the pawl when there is a friction force between the pawl and sector preventing the pawl from entering the sector.

2. The park brake assembly of claim 1 wherein the rod is further coupled to the pawl.

3. The park brake assembly of claim 1 wherein the sector includes a plurality of teeth formed thereon for receiving at least one tip of the pawl.

4. The park brake assembly of claim 3 wherein the at least one tip of the pawl includes only one tip.

5. The park brake assembly of claim 3 wherein the at least one tip of the pawl includes multiple tips.

6. The park brake assembly of claim 1 wherein the pawl translates from a first pivot axis to a second pivot axis relative to a pivot center.

7. The park brake assembly of claim 6 wherein the first pivot axis changes relative to the second pivot axis in an angular shift wherein a half lock condition is prevented.

8. The park brake assembly of claim 6 wherein the first pivot axis changes relative to the second pivot axis in an angular shift of less than 0.1 millimeters.

9. The park brake assembly of claim 1 wherein the pivot slot has a size larger than the pawl pivot providing a clearance allowing a specified translation.

10. The park brake assembly of claim 1 wherein the pawl slot includes a shape providing a clearance allowing a specified translation.

11. The park brake assembly of claim 10 wherein the pivot slot has an ovoid shape.

12. The park brake assembly of claim 1 wherein the pawl pivot includes a shape providing a clearance allowing a specified translation.

* * * * *